United States Patent
Davidsson

(10) Patent No.: US 12,384,924 B2
(45) Date of Patent: Aug. 12, 2025

(54) ENVIRONMENTALLY BENIGN ANTIFOULING COATING

(71) Applicant: Hripa EHF, Selfoss (IS)

(72) Inventor: Hreggvidur Davidsson, Selfoss (IS)

(73) Assignee: Hripa EHF, Selfoss (IS)

( * ) Notice: Subject to any disclaimer, the term of this patent is extended or adjusted under 35 U.S.C. 154(b) by 652 days.

(21) Appl. No.: 17/753,667

(22) PCT Filed: Sep. 11, 2020

(86) PCT No.: PCT/IS2020/000001
§ 371 (c)(1),
(2) Date: Mar. 10, 2022

(87) PCT Pub. No.: WO2021/048880
PCT Pub. Date: Mar. 18, 2021

(65) Prior Publication Data
US 2022/0332955 A1   Oct. 20, 2022

(30) Foreign Application Priority Data

Sep. 13, 2019   (IS) .......................................... EU9125

(51) Int. Cl.
*C09D 5/16* (2006.01)
*A01N 25/02* (2006.01)
(Continued)

(52) U.S. Cl.
CPC ........... *C09D 5/1625* (2013.01); *A01N 25/02* (2013.01); *A01N 55/02* (2013.01); *A01N 59/06* (2013.01);
(Continued)

(58) Field of Classification Search
CPC ...... C09D 5/1625; C09D 1/04; C09D 5/1662; C09D 7/20; C09D 5/14; A01N 25/02;
(Continued)

(56) References Cited

U.S. PATENT DOCUMENTS

| | | | | |
|---|---|---|---|---|
| 3,635,337 A | * | 1/1972 | Mercade .................. | B03D 1/06 209/166 |
| 4,842,903 A | * | 6/1989 | Hayner .................... | B05D 7/14 428/467 |
| 6,673,433 B1 | * | 1/2004 | Saeki ....................... | B01J 35/39 428/323 |

FOREIGN PATENT DOCUMENTS

| CN | 111269593 A | 6/2020 | | |
|---|---|---|---|---|
| EP | 282863 A | * | 9/1988 | ............. C11D 1/662 |

(Continued)

OTHER PUBLICATIONS

WIPO, U.S. International Search Authority, International Search Report and Written Opinion mailed Nov. 25, 2020 in International Patent Application No. PCT/IS2020/000001, 11 pages.

*Primary Examiner* — Coris Fung
*Assistant Examiner* — Keling Zhang
(74) *Attorney, Agent, or Firm* — Inskeep IP Group, Inc.

(57) ABSTRACT

The present invention is directed to environmentally benign coatings that can prevent fouling of submerged structures and surfaces in the marine environment. The coating is essentially a grease composition composed of an organic acids salt, mineral oil, a solvent and alkaline silicate. The sulfonate thickener is an oil soluble dispersing agent selected from a plurality of organic acids in a form of alkali metal salt or alkaline earth metal salt thereof, such as calcium sulfonate. Coating compositions of the invention can be used to coat surfaces, such that when such surfaces are exposed to or kept submerged in seawater they will prevent fouling of such surfaces when exposed to the marine environment for extended time.

17 Claims, 4 Drawing Sheets

(51) Int. Cl.
  *A01N 55/02*  (2006.01)
  *A01N 59/06*  (2006.01)
  *A01N 59/08*  (2006.01)
  *C09D 1/04*  (2006.01)
  *C09D 7/20*  (2018.01)

(52) U.S. Cl.
  CPC .............. *A01N 59/08* (2013.01); *C09D 1/04* (2013.01); *C09D 5/1662* (2013.01); *C09D 7/20* (2018.01)

(58) Field of Classification Search
  CPC ........ A01N 55/02; A01N 59/06; A01N 59/08; A01N 41/04; A01P 1/00; A01P 3/00
  See application file for complete search history.

(56) References Cited

FOREIGN PATENT DOCUMENTS

| | | | | | |
|---|---|---|---|---|---|
| EP | 0587434 | A1 | | 3/1994 | |
| EP | 1394289 | A1 | * | 3/2004 | .......... C10M 135/10 |
| GB | 2125809 | A | | 3/1984 | |
| WO | WO2004/085552 | A1 | | 10/2004 | |

* cited by examiner

ENVIRONMENTALLY BENIGN ANTIFOULING COATING

RELATED APPLICATIONS

This application is the U.S. National Phase of and claims priority to International Patent Application No. PCT/IS2020/000001, International Filing Date Sep. 11, 2020, entitled Environmentally Benign Antifouling Coating; which claims benefit of and priority to Iceland Application No. EU9125 filed Sep. 13, 2019 entitled Environmentally Benign Antifouling Coating; both of which are incorporated herein by reference in their entireties.

BACKGROUND

Biofouling involves the accumulation of microorganisms, plants, algae, and marine invertebrates onto surfaces exposed to the aquatic environment. The build-up of biofouling on marine vessels and nets for example can pose a significant problem, reducing efficiency, damaging hull structures and propulsion systems. Fouling on aquaculture nets can prevent flow of water and reduce oxygen supply to fish and makes the nets heavy and increases probability of damage in bad weather or in strong currents (Ashraf et al. 2017; Morte, 2018).

Biofouling can be defined as the undesirable attachment and growth of microorganisms, algae and animals on submerged substrates leading to damaged function or even corrosion or other form of biodeterioration. Biofouling is a natural process which can affect both living organisms and man-made surfaces (Chaudhari and Murlidhar, 2017).

Marine biofouling has primarily been studied because of its effects on frictional drag of boats and ships and have been classified into three categories, depending on their impact on the increase of frictional drag. First attachment is normally by microfoulers (bacterial, fungal and microalgal biofilms), having only small effect on drag but next come soft macrofoulers (macroalgae) which account for about 10% increase in drag and then hard macrofoulers (barnacles, mussels, tubeworms, bryozoans) leading to up to 40% increase in drag (Marechal and Hellio, 2009). Depending on the geographical locations, the species that compose the biofouling vary greatly depending on the substrate and environmental conditions. Moreover, the spawning season of the organisms and consequently the pressure of fouling vary significantly according to latitude and longitude. Less fouling development is in winter with the main spawning season being from spring to late summer. In tropical and sub-tropical areas there is less variation in water temperatures and light levels resulting in continuous reproduction and biofouling occurring throughout the year. Over time, the accumulation of biofoulers can increase the hydrodynamic volume of a vessel, leading to significantly increased frictional drag. This drag increase can decrease speeds by up to 10%, which can require up to a 40% increase in fuel to compensate. With fuel typically comprising up to 70% of the entire operating cost of a typical commercial ocean going vessel, effective antifouling methods can give big savings to shipping companies and lower their $CO_2$ emissions.

Antifouling coatings on marine structures are necessary in order to avoid the colonization of surfaces by biofoulers and consequently the high costs relative to transport delays, hull repairs, cleaning of desalination units and aquaculture cage nets, resulting in enormous costs for operators. During the 1960s the chemical industry developed efficient antifouling paints using organotin compounds: tributyltin (TBT) and triphenyltin (TPT). These chemicals were highly toxic for many aquatic organisms and have been proven to contaminate the food chain and to be persistent in the environment. Since the ban of TBT-based paints (AFS Treaty, 2008), new formulation have been developed containing high levels of copper and herbicides such as Irgarol 1051, diuron, chlorothalonil, dichlorofuanid and zineb. Although these paints were claimed to be environmentally friendly when first put on the market, there are now evidences of a widespread problems of these compounds in many countries, such in Europe, North America and Japan, with significant concentrations in marinas and harbors (Ytreberg et al., 2010).

The global environmental awareness among the public and legislators has led to various legislative actions that have completely changed the environment for antifouling development. Biocidal products used to be developed incrementally, where safety data was generated gradually along with market testing, but that is no longer possible, since the introduction of the Biocidal Products Directive 98/8/EC has changed all this. The regulatory authorities now require testing of new active substance before marketing authorization. All environmental testing takes long time and is very costly so for introduction of new antifouling compounds on the market will represent both an economic and environmental challenge. Although several antifouling compositions have been described and claimed to be non-toxic, it still remains a major challenge to provide industrially useful and viable environmentally friendly solutions for the different structures, and conditions experienced in marine applications (Maréchal and Hellio, 2009).

The antifouling composition of the present invention is made entirely from compounds that have been used for a long time in industry and homes and have therefore all been thoroughly tested and allowed for use in numerous industrial applications, as well as in many household and personal care products. Therefor all of the components used in the antifouling composition of the present invention are listed as food grade, which will greatly facilitate the process of market authorization and marketing acceptance of products based on the invention.

Oil soluble high molecular weight organic acids and various salts thereof, mainly metal salts are well known under different names, also called soaps, surfactants, detergents, dispersants, thickeners, emulsifiers and more. Such organic acid salts are widely used in industrial, household and personal care products. Among the better known substances in this class are alkyl-aril sulfonic acid salts which are the largest in quantity of all surfactants produced. Their importance lies in its power of reducing oil-water interfacial tension. They have wide applications based on their functional properties, i.e., emulsification and de-emulsification, dispersion, wetting, solubility, inhibition of rust and corrosion. Originally they came mainly as petroleum sulfonates, also now called natural sulfonates, but increasingly they are now synthetic as well. They can be represented by the general formula $R_xArSO_3M$, where $R_xAr$ represents complex alkyl-aromatic, alkyl-naphthalene radicals derived from petroleum, but which are now increasingly synthetic, derived from different long-chain alkyl-substituted aromatics, such as poly-dodecyl benzene residues. Various metal sulfonates are then prepared by reacting the corresponding acids with different metal base or with an organic base to form the corresponding salt. High molecular weight organic salts, like the sulfonates, are oil soluble and can be mixed in different proportions with most oils and solvents, and as such they are widely used as lubricants and for various coating purposes.

Sulfonic acids used in this invention are classified generally as either petroleum sulfonic acids or synthetic sulfonic acids. Petroleum sulfonic acids, also called natural sulfonic acids are produced from petroleum fractions, and synthetic sulfonic acids are produced from relatively pure synthetic aromatic hydrocarbons in the same manner. The sulfonic acids as they form part of this invention are petroleum sulfonic acids or synthetic hydrocarbon sulfonic acids having molecular weights ranging between about 400 and to about 1200, preferably in the range of about 400 to about 600.

The use of sulfonic-containing composition for corrosion prevention is widely known in the prior art and many such compositions have been used for decades in lubricants for engine protection and as corrosion protection in automobiles, such as described in U.S. Pat. No. 4,842,903.

The use of sulfonate-containing antifouling coatings is known in the prior art such as U.S. Pat. No. 4,842,903 that describes U.S. Pat. No. 9,045,650 that describes polymer with salt groups and antifouling coating composition comprising said polymer and U.S. Pat. No. 10,351,716 that describes antifouling coating composition comprising of at least two salt-containing copolymers, but in the above patents the salts are organic salts and not metal and no examples are known where the sulfonates are used to carry alkaline silicates as in the present invention. Numerous other compositions and methods for delivering antifouling effects on marine structures and nets have been described in the prior art, including using a silicon based hydrogel such as in U.S. Pat. No. 6,476,095B2 for antifouling coating composition and or organic chelating compounds and metal salts for use in marine antifouling coating compositions such as is described in U.S. Pat. No. 7,335,248B2.

Numerous environmentally friendly antifouling paints and coatings have been described in the prior art, such as in U.S. Pat. No. 7,989,520B2 which describes an environmentally friendly antifouling paint that comprises a resin, a finely milled tourmaline and an alkali metal, an alkali earth metal and/or an oxide thereof. The antifouling effect of U.S. Pat. No. 7,989,520B2 was explained from the piezoelectricity property of tourmaline so that it generates electric charge on the surface when pressurized so that it constantly generates small amount of anions and that together with the alkali metals or alkaline earth metals it would release negative ions making the film around the paint alkaline, which would inhibit growth of organisms and therefore provided the antifouling effect of the paint. Since the released ions are natural and non-toxic compounds the use of the pain of their invention would have no effect on the environment.

Many other resin-based antifouling paints and coatings, containing various types of active organic compounds or biocides, have been described in the prior art and many of which are claimed to be environmentally friendly, since they would not be based on any tin- or copper compounds.

Alkaline silicates are widely used in industry in adhesives, in cleaning compounds, cements and many more. They are also known as water glass since a solution of alkaline silicate can be changed into gels by lowering in pH or by adding divalent metal ions such as calcium or magnesium. The chemical properties and behavior of alkaline silicate solutions under different conditions is thoroughly discussed by Hamouda and Akhalaghi (2014). Therefor various experiments have been done in order to use silicate gels to bind or as an additional coating material for antifouling coatings. In GB2,125,809A is described an antifouling coating composition based on using alkaline silicate with magnesium to for a gel as a binder for calcium sulfate and zinc salt compounds, where the zinc ions are the expected known antifouling agent. In JPS56,161,477A is described a mildew-proofing coating material that is made from alkaline silicate and made into a cold hardener by mixing with calcium or magnesium or aluminum salts, thereby forming a gel that would be used as a binder for the active biocidal compound in question. U.S. Pat. No. 4,513,026A describes an antifouling composition composed of alkaline silicate as binder and main component that when mixed together with MgO and calcium sulfate to incorporate metallic zinc or inorganic zinc compounds can provide the antifouling activity in seawater. Examples of the alkali silicate used in U.S. Pat. No. 4,513,026 include sodium silicate, potassium silicate, lithium silicate, quaternary ammonium silicate, and mixtures of two or more of these. The solids content of the alkali silicate used as described in U.S. Pat. No. 4,513,026 are very high, typically about 15 to about 50% by weight.

The numerous approaches and solutions for antifouling coatings in the prior art have been well reviewed by Nurioglu et al. (2015).

SUMMARY OF THE INVENTION

In the present invention we describe the characteristics of a composition and method for making a new antifouling coating composed entirely and only of environmentally friendly substances. The composition is characterized in that it comprises, in terms of percentages of the weight of the final composition, from about 10% to about 70% by weight of an organic acid salt, from about 10% to about 70% by weight mineral oil, from about 1% to about 40% by weight of a water soluble organic solvent, and from about 2% to about 40% by weight of an alkaline silicate solution.

Preferably the organic acid salt of the composition is a sulfonic acid salt of alkali metals or alkaline earth metals. The sulfonic acid salt can preferably be a salt with a divalent cation. In some embodiments, the salt is selected from sodium, barium and calcium. In one embodiment, the alkali metal is barium. In another embodiment, the alkali metal is calcium. The organic acid salt can preferably be selected from barium sulfonate, sodium sulfonate or calcium sulfonate.

Preferably the organic acid salt of is a grease-type thickener that is characterized by NLGI grade of 1 or higher. The term "NLGI" refers to the measure of relative hardness of grease established by the National Lubricating Grease Institute. The organic acid salt is preferably soluble in oil, such as mineral oil.

The organic solvent of should have sufficient water and organic solvent miscibility to allow homogenous mixing of the alkaline silicate solution of to the organic acid salt of and the mineral oil of to form a stable and soft homogenous mixture. The organic solvent can preferably comprise an alkyl alcohol or a mixture of two or more alkyl alcohols. The organic solvent more preferably comprises at least one alkyl diol or alkyl triol, more preferably at least one alkyl diol or alkyl triol having from 2 to 6 carbon atoms. Exemplary alcohols include 1,2 propylene glycol, 1,3 propylene glycol, ethylene glycol, glycerol, and 1,2 butenediol. The alkyl alcohol or mixture of alcohols may be in a mixture with one or more additional organic solvents, as long as the final organic solvent has the necessary miscibility with other components of the composition so that a stable and soft homogeneous mixture can be formed.

The alkaline silicate solution preferably comprises from about 0.5 to about 6 Mol/L of silicic acid and from about 0.5 to about 6 Mol/L of a suitable base, preferably sodium hydroxide or potassium hydroxide. The alkaline silicate solution can preferably be made from sodium silicate or potassium silicate, or mixtures thereof.

The alkaline silicate solution can preferably comprise from about 1 to about 6 Mol/L, more preferably from about 1 to about 5 Mol/L, more preferably from about 1.5 to about 4 Mol/L, more preferably from about 1.5 to about 3 Mol/L, more preferably from about 1.7 to about 2.5 Mol/L, of silicic acid in an aqueous basic solution.

The base can preferably be in a concentration in the range from about 1 to about 6 Mol/L more preferably from about 1.5 to about 5 Mol/L, more preferably from about 1.7 to about 4 Mol/L, more preferably from about 2 to about 3 Mol/L, in an aqueous solvent, preferably water.

The mineral oil in the composition can be any suitable mineral oil that is commonly used in industry or as common organic solvent in painting. The mineral oil can be a liquid oil that is obtained as a byproduct of oil refining that is commonly composed of various alkanes and cycloalkanes. The mineral oil can also, be obtained by distillation of tree resin, such as turpentine. This can include white spirit, Stoddard solvent, petroleum and the like commonly used as paint thinners.

The ingredients can be suitably mixed together using processing methods known in the art. The final mixture should be homogenous and sufficiently soft so that it can be spread onto surfaces.

The present invention further provides a method for preventing fouling of a structure which may become or has been in contact with sea water, which comprises coating an antifouling coating composition as disclosed herein.

In one such embodiment, the composition can comprise:
(a) at least one neutral or overbased salt of an organic acid selected from the group consisting of sulfonates, phosphonates, carboxylates and phenates, at about 10 to about 70% by weight and
(b) at least one type of mineral oil, at about 10 to about 70% by weight and
(c) at least one type of a water soluble organic solvent, at about 3 to about 35% by weight and
(d) at least one type of alkaline silicate solution at about 2 to 35% by weight of a solution comprising from about 0.5 to about 6 Mol/L of silicic acid and from about 0.5 to about 6 Mol/L of a base, preferably sodium hydroxide or potassium hydroxide;

Further provided is method of coating solid substrates made of metal, stone, plastics or fiber-reinforced composites, wherein a composition as disclosed herein is applied to the substrate. The application can be done by any of coating method, such as brushing, dipping, rolling or spraying.

Also provided is a method of coating flexible solid substrates, such as ropes and nets, made of plastics or fiber-reinforced composites, wherein a composition as disclosed herein is applied to the flexible solid substrate.

The substrate that is being treated is preferably a substrate that, when in use, may be, or is, in contact with sea water. Application can be done by any of coating method, such as brushing, dipping, rolling or spraying.

Additional features and advantages of the present invention are described in, and will be apparent from, the following detailed description of the invention and the examples.

DETAILED DESCRIPTION OF THE INVENTION

Figure 1A:
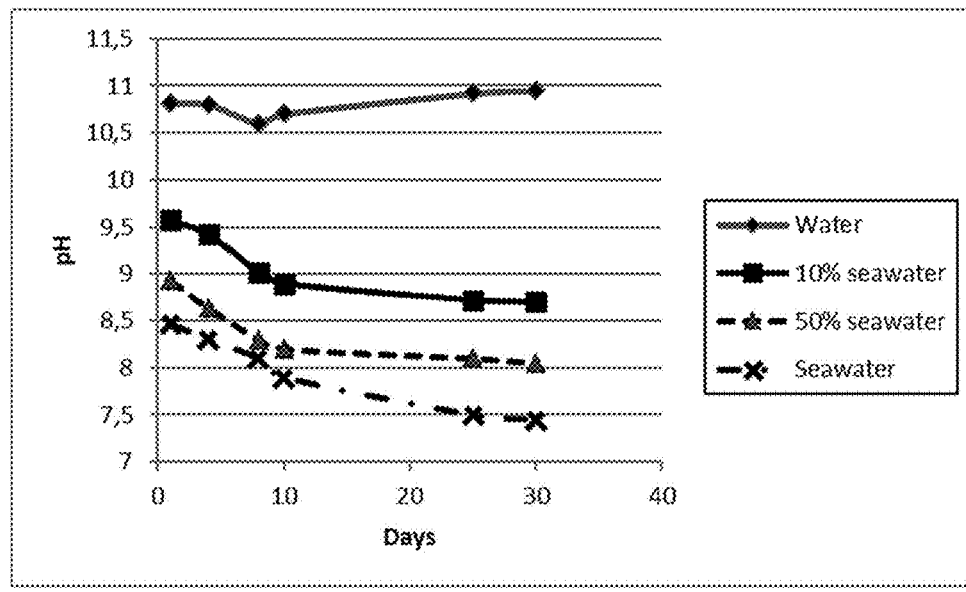
FIG. 1A shows the results from testing of the leaching of alkalinity from a 40 cm of net line coated with the antifouling composition of the invention during 30 day incubation in different water at 15° C. The composition used here was according to formulation 110 in Table 1. The leaching was monitored by measuring pH. The leaching of the alkaline silicate from the antifouling composition in pure water was about 25%, from 10% seawater it was about 3%, from 50% seawater it was about 0.5% and from 100% seawater it was about 0.1%. No precipitate could be detected in any of the test solutions, as monitored by light absorbance.

The invention is based on the use of known chemical and physical principles to combine chemical components in a new way, which when combined according to the present invention provide an effective antifouling coating that can be used on surfaces in the marine environment. The components of the invention are generally considered food grade and non-toxic to the environment.

The composition and method of the invention is therefore useful, environmentally friendly and commercially viable. The invention is therefore expected to be useful and consequently to have large potential for industrial application and commercial use.

The novel composition of the present invention has as its primary component and binder, a high molecular weight organic acids salt that forms a soft and open coating of surfaces that are essentially insoluble in water so the soft coating is stable and partly water-repelling but also contains micellar structures. When mixed in the proper proportions with a water soluble solvent it can incorporate a certain amount of water containing a soluble alkaline silicate at high pH and when properly mixed it forms a homogenous and stable composition that can be further diluted with mineral oils into the proper consistency as to be applied for coating of various surfaces to be immersed in sea water. Upon drying for one or few days some of the mineral oil will have evaporated making the coating dry upon touching but still soft.

In general the composition can comprise in the range of about 10% to about 70% by weight of at least one neutral or overbased salt of an organic acid selected from the group consisting of sulfonates, phosphonates, carboxylates and phenates, preferably in the range of about 10% to about 60% by weight, more preferably about 10% to about 50% by weight.

The composition further can comprise in the range of about 10% to about 70% by weight of at least one type of mineral oil, preferably in the range of about 10% to about 60% by weight, more in the range of about 10% to about 50% by weight, more preferably in the range of about 20% to about 50% by weight.

The composition further can comprise in the range of about 1% to about 30% by weight of at least one type of a water miscible organic solvent, preferably an alkyl alcohol, preferably in the range of about 2% to about 30% by weight, more preferably in the range of about 3% to about 25% by weight.

The composition further can comprise in the range of about 2% to about 40% by weight of at least one type of alkaline silicate solution, i.e. a solution containing at least one type of alkaline silicate, preferably in the range of about 5% to about 35% by weight or in the range of about 10% to about 35% by weight.

Without intending to be bound by theory, it is believed that upon immersion into seawater or brackish water, being at neutral or slightly alkaline pH and containing magnesium and calcium ions, the alkaline silicate solution is incorporated in micelles inside the organic acids salt coating, and will turn into gel, but that remains highly alkaline in nature and which together with the oily nature of the organic acid salt, will provide the antifouling activity against marine organisms attempting to settle on the surfaces that have been treated with the coatings of the present invention.

Due to the gel formation of the alkaline silicate of the invention when in seawater the alkalinity remains inside the composition and thereby having the observed antifouling effect as shown by the invention. Since gel formation is primarily facilitated in seawater from the high inherent concentrations of divalent cations such as $Ca^{+2}$ and $Mg^{+2}$ if forms quickly and is stable inside the composition. Gel formation of alkaline silicate is also facilitated by lowering the pH below about 10.5 so therefore when compositions of the invention containing about or below 10% of alkaline silicate solution is put in water or seawater, the measured pH can be lower than expected from the internal content of the alkaline silicate. However, when compositions of the invention contain more than 10%, and especially between 15-25% of the alkaline silicate solution and when such compositions are put in water the amount of released alkali high enough to prevent gel formation and high pH is measured. Composition containing 15-25% alkaline silicate solution is however stable in seawater and normally only less than 10% of the alkali is released in the beginning after coming into seawater but remains stable after that.

It has thus been found that the composition retains the alkaline silicate solution in seawater, which in part is believed to underly its antifouling properties. Thus, marine organism that otherwise would attach to an untreated surface or a surface treated by alternative coatings will not be viable on the treated surface, due to its biologically hostile environment.

Despite its biofouling properties, the composition is environmentally friendly, since it only contains non-toxic components, and in particular does not contain toxic trace elements such as heavy metals.

The composition can be prepared by mixing the components, i.e. a neutral or overbased organic acid salt, a mineral oil, one or more organic solvents and alkaline silicate solution. Other additives, such as biocides or other natural and/or synthetic compounds having repelling effects against fouling organisms can be added. In general, there is no particular restriction on the method of mixing these components. For example, liquid substances can be most easily mixed by using a rotary stirrer, or other suitable mixing devices and blenders. The composition can in general be prepared as a "one-pot" mixture, blending all components together. The composition can also be prepared by sequential addition of components while mixing or stirring the solution.

The organic solvent portion of the composition is believed to aid in the formation and/or stability of micelles, which is believed to represent a key feature of the antifouling properties of the composition. The organic solvent should have sufficient water and organic solvent miscibility to allow homogenous mixing of the alkaline silicate solution to the organic acid salt of and the mineral oil to form a stable and soft homogenous mixture.

The present invention also provides a method for preventing fouling of a structure which may be or is contacted with sea water by using the antifouling composition of this invention.

Structures that may come into contact with sea water includes structures in bays and ports and at sea, structures for recreational or commercial use, structures for fishery, fishing nets, aquaculture cage nets and structures located on coastal areas. Constructs include ships, boats, barge or other floating vessels, or harbor constructs, or other land or sea constructs that come into contact with seawater, such as platforms, rigs or the like.

Contact with sea water may be complete or partial insertion in seawater of a construct. The contact may also be contact via seawater that is propelled by wind or waves onto the surface, i.e. onto surfaces that normally would not be immersed in seawater but may be exposed through air-borne transmission of the seawater.

Examples of substrates which constitute the contacting portions of the above structures are substrates made of synthetic organic materials, such as plastics of various kinds (e.g. in fishing nets), but also structures made of inorganic materials such as metals and concrete.

The coating treatment of the aforesaid structures can be carried out by using any desired known means capable of coating the composition of this invention on the structures. For example, spray coating, roller coating, brush coating, or soaking and the like can be used. Since the antifouling coating composition of this invention is stable at room temperature in closed containers it can be stored for a long period of time after it is prepared and applied as convenient, just like any other paint or coating. It will therefore not fully self-cure to form the internal alkaline silicate gel until after coming in contact with seawater or similar aqueous fluids. After the coating treatment, the coated surface may be allowed to dry by itself.

The thickness of the coated layer is properly selected for the desired application, and is, for example, about 20 μm to about 1 mm.

One method of preparing the antifouling composition of the invention is by first mixing into hot water of a metal silicate, such as sodium silicate and about equal molar proportions of a base, such as sodium hydroxide, then taking a portion of the so prepared alkaline silicate solution and adding it at ambient temperatures, to a mixture already containing the organic acid salt and the mineral oil and the water soluble organic solvent in the preferred proportions.

In an embodiment, the method comprises steps of:
a. heating water to about 90° C. and with mixing add slowly both sodium silicate and sodium hydroxide in about equal proportions, blending in total from about 10 to about 60 weight percent of sodium silicate and, based on the weight of the final composition, and from about 2 to about 40 weight percent sodium hydroxide until all is soluble in a clear solution, that is also called water glass;
b. adding about 10 to about 70 weight percent of sulfonate to about 10 to about 70 weight percent of mineral oil, blending the two to make soft paste, followed by adding 3 to about 25 weight percent of water soluble organic solvent and mixing at ambient temperature;
c. adding about 2 to about 25 weight percent of the alkaline silicate solution to the paste at ambient temperatures until fully mixed and soft of the desired consistency to be used for spreading onto surfaces.

In certain embodiments of the invention the respective components of the antifouling composition can be obtained from various commercial sources, such as for example many organic acid salts used in the invention can be obtained as different metal salts or already as such mixed with suitable mineral oils in various proportions. In other words, the organic acid salt may be used as is from a commercial source that includes one or more mineral oil.

In other embodiments of the invention such commercially available components can be further modified be adding more or other types of mineral oil or the final consistency of the composition can be adjusted by adding oil or solvent after all the main components have been mixed.

In certain embodiments of the invention the alkaline silicate solution components of the antifouling composition can be obtained ready made from various commercial sources.

A further embodiment of the invention is that the alkaline solution of the invention can be prepared from other available sources such as from various silicate minerals and also that silica is available in numerous mineral forms, so-called silicate minerals, such as quartz, diatom earth and more (https://en.wikipedia.org/wiki/Silicate_minerals). It should be further understood that to those skilled in the art, that alkaline silicate solutions can be made in many different ways and with different ratios of silica, represented as $SiO_2$ and the metal base represented with general formula as MO or MOH, most commonly as $Na_2O$ or NaOH. Furthermore it should be understood that for the purpose of the invention that silica or silicic acid can occur naturally or even in solution in different degrees of polymerization and that the alkaline silicate solution of the current invention or its components can be obtained commercially from many sources.

In one aspect of the invention, the antifouling composition can be coated on surfaces by painting, spaying or soaking of the respective surfaces to be treated. The so treated surfaces are preferably allowed to dry for one day or few days before being put into the sea at the place of use.

Unless defined otherwise, all technical terms used herein have the same meaning as commonly understood by one of ordinary skill in the art to which the invention belongs. Although any methods and materials similar or equivalent to those described herein can be used in the practice or testing of the present invention, exemplary methods and materials are now described.

It will be appreciated that variations to the foregoing embodiments of the invention can be made while still falling within the scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination and order, unless explicitly stated otherwise, except for combinations where at least some of the features and/or steps are mutually exclusive. In particular, preferred features of the invention are applicable to all aspects of the invention and may be used in any combination.

It should be understood that various changes and modifications to the presently preferred embodiments described herein will be apparent to those skilled in the art. Such changes and modifications can be made without departing from the spirit and scope of the present invention and without diminishing its intended advantages.

Example 1

This example demonstrates several different compositions of the chemical components in the invention. Table 1 shows several possible weight ratios of the different components that can be mixed in order to obtain a functional and useful antifouling composition. The type of sulfonate used is as follows; BaS, neutral Barium sulfonate of average molecular weight 1.040; NaS, neutral Sodium sulfonate of average molecular weight 420; CaS N, neutral Calcium sulfonate of average molecular weight 800; CaS400, overbased Calcium sulfonate of average molecular weight 600. The numbers in Table 1 indicate final weight present in each formulated composition. All compositions shown have sufficient stability and functionality to be useable as antifouling agent according to the invention. The compositions of formulations 106, 107, 108 and 109 with 24-32% Barium sulfonate, 14-25% alkaline silicate solution, 12-23% propylene glycol and 25-45% mineral oil showed the overall best performance in terms of easy application on surfaces, dry coat cover and stability both in storage and in use with little initial release/loss of alkalinity when put into seawater.

Therefor the alkaline silicate remains inside the coated composition, probably in the form of an alkaline gel that explains, how together with the oily surface the composition can prevent fouling of surfaces in the marine environment. This effect is well demonstrated in FIG. 5 where two

TABLE 1

Examples of different ratios of the components of the invention that will function as antifouling preparation.

| | Composition no | | | | | | | | | | | | |
|---|---|---|---|---|---|---|---|---|---|---|---|---|---|
| | 101 | 102 | 103 | 104 | 105 | 106 | 107 | 108 | 109 | 110 | 111 | 112 | 113 |
| | | | | | | Sulfonate type | | | | | | | |
| | BaS | BaS | BaS | BaS | BaS | BaS | BaS | BaS | NaS | CaS N | CaS N | CaS400 | CaS400 |
| Sulfonate | 45% | 42% | 31% | 27% | 16% | 32% | 28% | 24% | 32% | 35% | 22% | 34% | 26% |
| Alkaline silicate solution | 26% | 18% | 21% | 25% | 27% | 14% | 17% | 20% | 13% | 16% | 20% | 23% | 33% |
| Propylene glycol | 3% | 15% | 17% | 20% | 23% | 12% | 16% | 17% | 10% | 11% | 13% | 22% | 24% |
| Mineral oil | 26% | 25% | 31% | 28% | 34% | 44% | 38% | 38% | 45% | 39% | 45% | 21% | 16% |
| | 100% | 100% | 100% | 100% | 100% | 100% | 100% | 100% | 100% | 100% | 100% | 100% | 100% |
| Dry coat, g/m of 4 mm rope | 4.1 | 3.5 | 3.5 | 3.5 | 3.1 | 3.5 | 3.1 | 3.5 | 2.5 | 3.1 | 6.5 | 7.5 | 8.5 |
| Separation in storage | Some | Some | Yes | Yes | Yes | No | No | No | No | Some | Some | Yes | Yes |
| Viscosity of paste | Soft | Soft | Soft | Soft | Fluid | Fluid | Fluid | Fluid | Fluid | Thick | Thick | Thick | Thick |

Example 2

This example as shown in FIG. 1A, demonstrates the function of the invention from testing of the leaching of alkalinity from a 40 cm of net line coated with the antifouling composition of formulation 110 of the invention during 30 day incubation in different water at 15° C. The leaching was monitored by measuring pH. The leaching of the alkaline silicate from the antifouling composition in pure water was about 25%, from 10% seawater it was about 3%, from 50% seawater it was about 0.5% and from 100% seawater it was about 0.1%. No precipitate could be detected in any of the test solutions, as monitored by light absorbance. Therefor the alkaline silicate remains inside the coated composition, probably in the form of an alkaline gel that explains, how together with the oily surface the composition can prevent fouling of surfaces in the marine environment.

Example 3

Figure 1B:
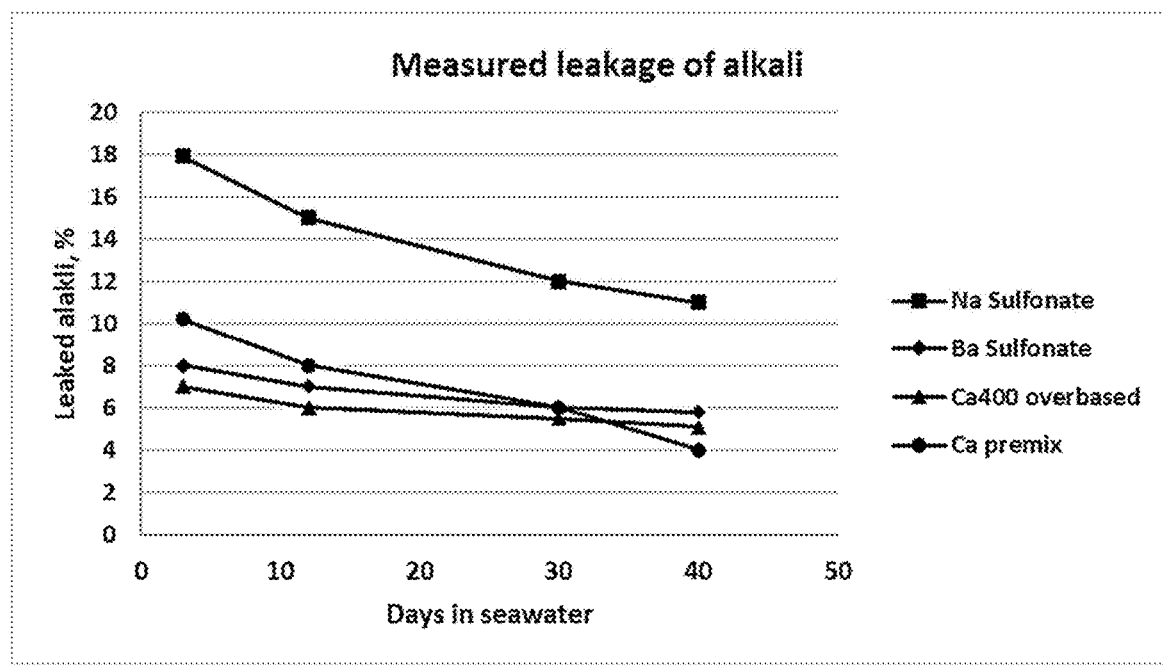
FIG. 1B shows the results from testing of the leaching of alkalinity from a 40 cm of net line coated with the antifouling composition of the invention made with different sulfonate salts by up to 40 days incubation in different water at 15° C. The leaching was monitored by measuring pH. The compositions were made according to formulations in Table 1 indicated in brackets, Na Sulfonate (formulation 109), Ba Sulfonate (formulation 103) Ca400 overbased (formulation 112) and Ca premix sold as rust protection (formulation 110). In this context and as disclosed herein, the term "S" refers to a sulfonate salt. The leaching of the alkaline silicate from the antifouling composition in seawater was as shown. The released alkali is partly neutralized with time by polymerization of silicate and neutralization from $CO_2$ and other components in the seawater.
Figure 5A:
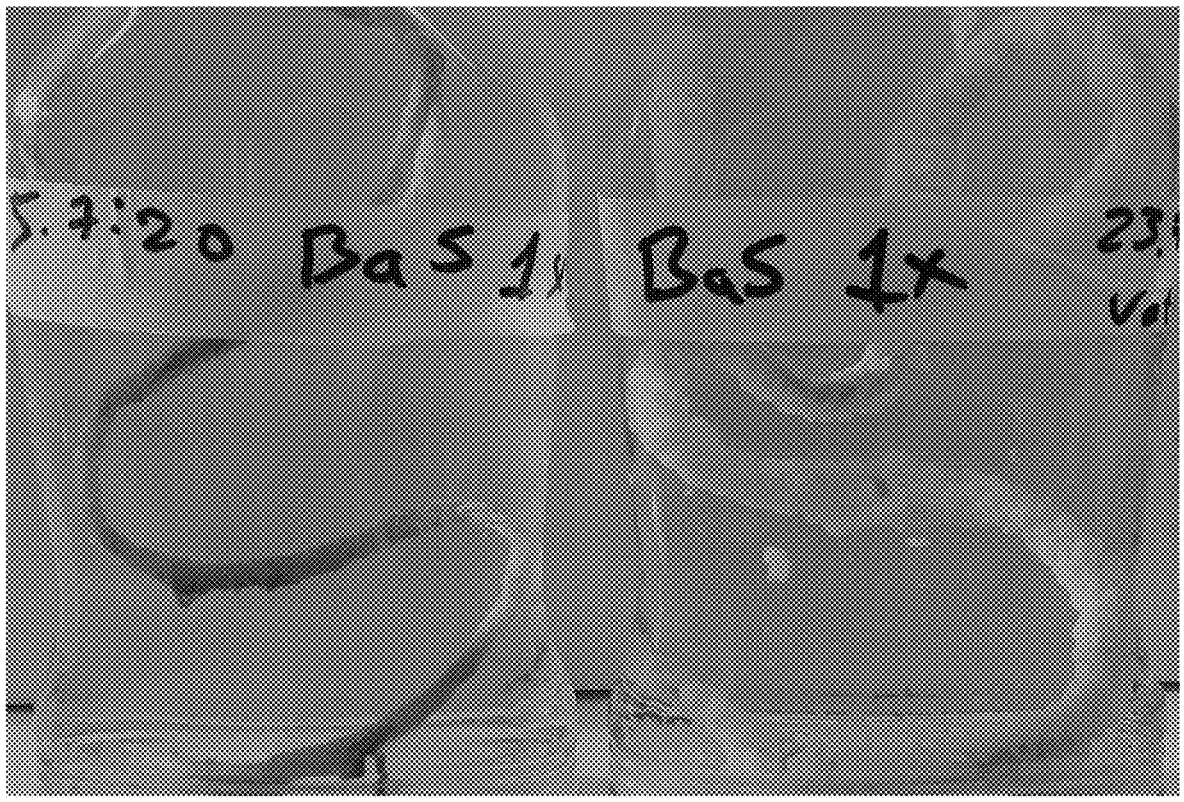
In FIG. 5A the formulation was 102 and 104 in FIG. 5B. The coating remains intact and releases little of the alkalinity in seawater whereas it is unstable, opens up and releases much or all of the alkalinity after some time in fresh water.
Figure 5B:
FIG. 5. Shows the stability of the composition of the invention on plastic-type ropes when put into seawater versus in fresh water.

This example as shown in FIG. 1B, demonstrates the function of the invention from testing of the leaching of alkalinity from a 40 cm of net line coated with the antifouling composition of the invention. made with different sulfonate salts by up to 40 days incubation in seawater at 15° C. The leaching was monitored by measuring pH by up to 40 days incubation in different water at 15° C. The leaching was monitored by measuring pH. The compositions were made according to the invention Na sulfonate (formulation 109), Ba sulfonate (formulation 103), Ca sulfonate overbased 400 (formulation 112) and commercially available neutral Ca sulfonate premix sold as rust protection (formulation 110). The leaching of the alkaline silicate from the antifouling composition in seawater was as shown. The released alkali is partly neutralized with time polymerization, and neutralization from $CO_2$ and other components in the seawater. The results show that divalent metal cations are more effective in maintaining the alkali inside the composition and show good stability in seawater.

compositions were used to coat a 4 mm plastic rope and 40 of such rope was put into 190 ml of seawater and fresh water respectively. FIG. 5A contained composition of formulation 102 and FIG. 5B contained composition of formulation 104. As seen the coating remains stable in both cases in seawater and with less than 5% release of alkalinity of the total base in the composition, even after 30 days and no further release up to 6 months. On the other hand in fresh water the coating starts to swell and fall off the rope even after a few days and the alkalinity is released as seen by increased pH, where at least 50% of the alkalinity is released from the composition with formulation 102 (FIG. 5B and 100% release of alkalinity from the composition with formulation 104 (FIG. 5A).

Example 4

Figure 2:
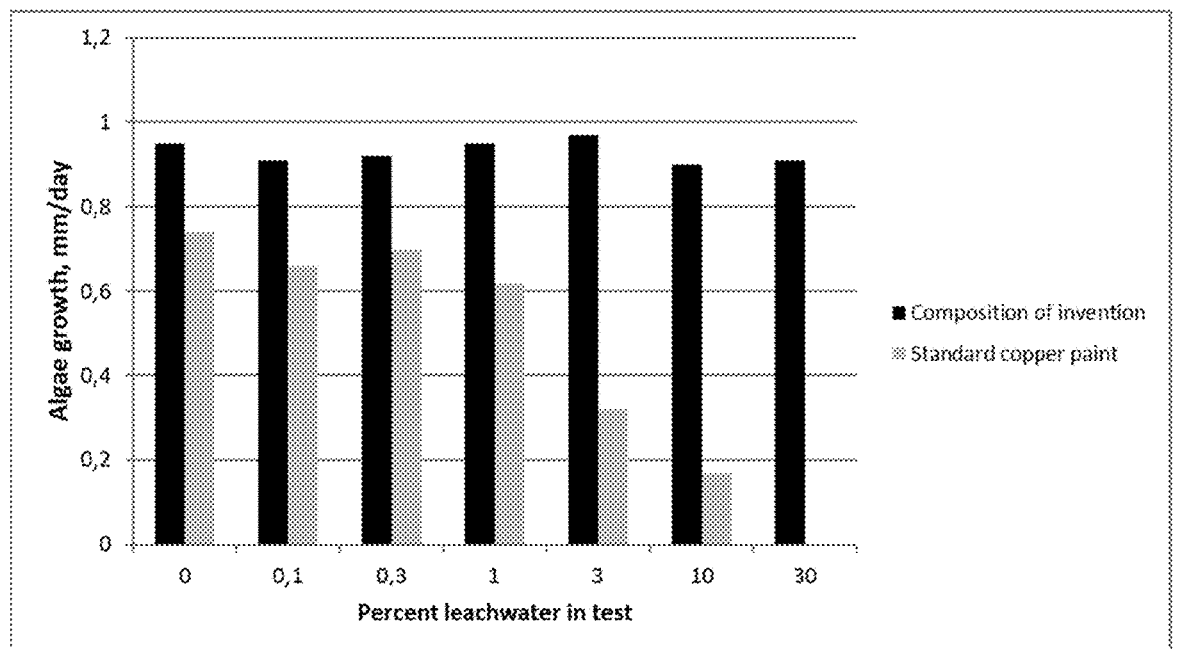
FIG. 2 shows the results of toxicity testing of the leachate from a composition of the invention according to formulation 110. The leachate was produced by incubating a surface coated with the composition in seawater for 14 days according to the method described by Ytreberg et al. (2010)

This example as shown in FIG. 2, demonstrates the non-toxicity function of the composition with formulation 110 of the invention from testing of leachate in growth medium of algae with a standard toxicity testing method as described by Ytreberg et al. (2010). The examples demonstrate that the composition and method of the present invention is non-toxic and environmentally friendly, since the leachate, even up to 30% in the growth medium, showed no inhibitory effects on the growth of the test-algae. As comparison it was shown that a standard copper-containing antifouling paint showed growth inhibition when the respective leachate used was more than 1% in the growth medium.

Example 5

Figure 3:
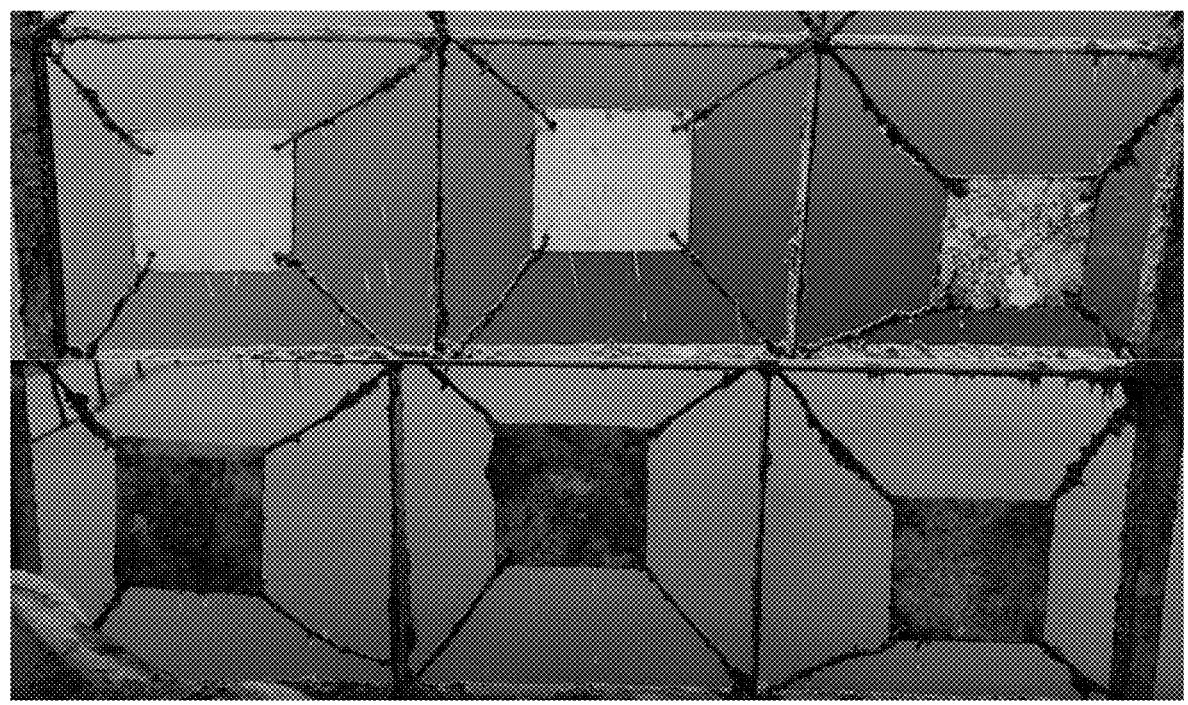
FIG. 3 shows the results of an antifouling experiment done with coatings of the composition on plates kept for 50 days in the sea at natural in situ conditions close to a commercial salmon farming cage in N-Iceland. The plates were of commercial fiberglass used as building materials for boats. The two plates on the left in the upper part of the figure were treated (coated) with formulation 106 and 108, respectively. The plate furthest to the right was untreated. The lower part of the figure shows the back side of the same plates, that were also all untreated. Substantial fouling had already started on the untreated plates, whereas no fouling growth had at this time started on the treated side of the plates.

This example demonstrates the antifouling function of the invention where plastic plates were coated with the composition according to formulation 102 and formulation 104 of the invention and incubated in seawater in natural settings and in a non-polluted environment. The results as shown in FIG. 3 show initial settlement of algae and first settling of small blue mussel larvae after 50 days in the sea.

Example 6

Figure 4:
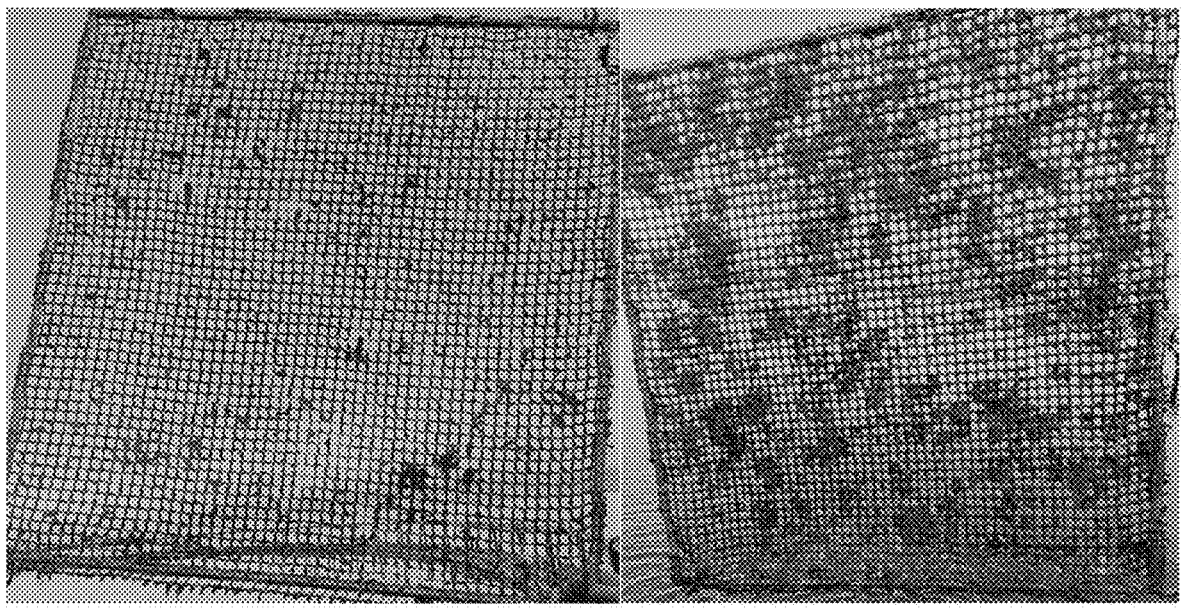
FIG. 4. Shows frames of stainless steel with 1 $m^2$ of aquaculture cage nets treated with the composition of the invention made according to formulation 108 and kept is the sea at the same place and time as the fiberglass plates in FIG. 3. The net on the left in the figure was treated but the net on the right was untreated. Only very little fouling growth (mainly algae at this stage) was seen on the treated net whereas already a substantial settlement of algae and other fouling organisms had occurred on the untreated net.

This example demonstrates the antifouling function of the invention where aquaculture cage nets treated with the composition according to formulation 108 of the invention that were kept submerged in open sea for 50 days with only limited attachment of soft algae and no attachment of hard crustaceans and shells as were started to be observed on the plates seen in FIG. 4.

The examples of useful compositions demonstrated and tested in Table 1 are good representations of possible and tested compositions that can be useful and fall within the scope of the present invention. Due to their overall chemical composition, viscosity and ease of use, the other compositions shown in Table 1, as well as several related variations are expected to show similar results as shown in Examples 2-6.

REFERENCES

Ashraf, P. M., K. G. Sasikala, S. N. Thomas and L. Edwin (2017). Biofouling resistant polyethylene cage aquaculture nettings: A new approach using polyaniline and nano copper oxide Arabian Journal of Chemistry, Available online.

Morte, J. C, (2018). Fouling management in cage aquaculture. New strategies on nets, fish health and economic impact. PhD. thesis at University of Barcelona, Spain.

Chandrakant, C. and K. Murlidhar, (2017), Adhesion of Fouling Organisms and its Prevention Technique. Intern. J. Adv. Res., Ideas and Innovations in Technology, 3; 427-439.

Maréchal, J.-P. and C. Hellio (2009) Challenges for the Development of New Non-Toxic Antifouling Solutions. Int J Mol Sci. 10: 4623-4637.

AFS Convention (2001) The International Convention on the Control of Harmful Anti-fouling Systems in Ships is a 2001 International Maritime Organization (IMO) treaty whereby states agree to prohibit the use of harmful anti-fouling paints and other anti-fouling systems that contain harmful substances. In particular, the use of the organotin tributyltin is prohibited.

Finnie, A. A. C. Price, R. M. Ramsden (2009) Polymer with salt groups and antifouling coating composition comprising said polymer U.S. Pat. No. 9,045,650.

Ramsden, R. M. C. Price, J. Fox (2015) Antifouling coating composition comprising at least two salt-containing copolymers U.S. Pat. No. 10,351,716.

Biocidal Product Directive 98/8/EC of the European Parliament and of the Council of 16 February 1998 concerning the placing of biocidal products on the market. In 2013 the Biocidal Products Directive was superseded by The Biocidal Products Regulation (BPR, Regulation (EU) 528/2012).

Hayner, R. E. (1989). Wax, sulfonate, dispersing oil sepiolite clay compositions for protective soft coatings. U.S. Pat. No. 4,842,903.

Simendinger W. H., (2001), Antifouling coating composition U.S. Pat. No. 6,476,095B2.

Abou-Nemeh I., (2005), Marine antifouling coating compositions U.S. Pat. No. 7,335,248B2.

Chun, H. H., I. Lee, H. Park, W. S. Chung, N.-J. Jo. (2007) Antifouling paint composition U.S. Pat. No. 7,989,520B2.

Hamouda, A. A. and H. A. Akhalaghi Amiri (2014). Factors Affecting Alkaline Sodium Silicate Gelation for In-Depth Reservoir Profile Modification. Energies, 7, 568-590.

Sakai T. (1982) Antifouling coating compositions, GB2125809A.

Sen, T, (1980), Mildewproofing coating material, JPS56161477A.

Ytreberg, E., J. Karlsson, and B. Eklund. (2010). Comparison of toxicity and release rates of Cu and Zn from anti-fouling paints leached in natural and artificial brackish seawater. Science of the Total Environment 408:2459-2466.

The invention claimed is:

1. An antifouling coating composition comprising:
   (a) in the range of about 10% to about 70% by weight of the final composition of at least one neutral or overbased salt of an organic acid selected from the group consisting of sulfonates, phosphonates, carboxylates and phenates, and
   (b) in the range of about 10% to about 70% by weight of the final composition of at least one type of mineral oil, and
   (c) in the range of about 1% to about 30% by weight of the final composition of at least one type of a water miscible organic solvent, and
   (d) in the range of about 2% to about 40% by weight of the final composition of at least one type of alkaline silicate solution comprising from about 0.5 to about 6 Mol/L of silicic acid and from about 0.5 to about 6 Mol/L of a base.

2. The antifouling composition of claim 1, comprising in the range of about 10% to about 60% by weight of the at least one neutral or overbased salt of an organic acid.

3. The antifouling composition of claim 1, comprising in the range of about 10% to about 60% by weight of the final composition of the at least one type of mineral oil.

4. The antifouling composition of claim 1, comprising in the range of about 2% to about 30% by weight of the final composition of the water miscible organic solvent.

5. The antifouling composition of claim 1, comprising in the range of about 5% to about 35% by weight of the final composition of the alkaline silicate solution.

6. The antifouling composition of claim 1, wherein the neutral or overbased salt of an organic acid is an oil-soluble sulfonic acid salt.

7. The antifouling composition of claim 1, wherein the neutral or overbased salt of an organic acid is an oil-soluble sulfonic acid salt of one or more petroleum sulfonic acid or one or more synthetic sulfonic acids, including alkyl sulfonic acids, alkaryl sulfonic acids and aromatic sulfonic acids.

8. The antifouling composition of claim 1, wherein the neutral or overbased salt is a sodium salt, a barium salt or a calcium salt.

9. The antifouling composition of claim 1, wherein the water soluble organic solvent of (c) is an alcohol, preferably an alkyl diol or an alkyl triol of 2 to 6 carbon atoms.

10. The antifouling composition of claim 1, wherein the alkaline silicate solution of (d) is a solution of metal salt of silicic acid.

11. The antifouling composition of claim 10 wherein the alkaline silicate solution is a solution of a sodium or potassium salt of silicic acid.

12. The antifouling composition of claim 1, wherein the alkaline silicate solution comprises about 2 to about 3 Mol/L, sodium hydroxide.

13. The antifouling composition of claim 1, wherein the water miscible organic solvent of (c) is an alkyl diol or an alkyl triol of 2-6 carbon atoms.

14. The antifouling composition of claim 1, wherein the least one neutral or overbased salt of an organic acid is a sulfonate.

15. The antifouling composition of claim 1, comprising in the range of about 20% to about 50% by weight of the final composition of the at least one type of mineral oil.

16. A method of coating hard, solid substrates made of metal, stone, plastics or fiber-reinforced composites, comprising applying said antifouling composition of claim 1 by brushing, dipping, rolling or spraying.

17. A method of coating flexible solid substrates, comprising ropes or net, made of plastics or fiber-reinforced composites, comprising applying said antifouling composition of claim 1 by brushing, dipping, rolling or spraying.

\* \* \* \* \*